March 23, 1965 H. J. MARSCHAK 3,174,442
DISPLAY STAND
Filed March 19, 1963 2 Sheets-Sheet 1

INVENTOR.
Howard J. Marschak
BY May R. Kraus
Attorney.

March 23, 1965     H. J. MARSCHAK     3,174,442
DISPLAY STAND

Filed March 19, 1963     2 Sheets-Sheet 2

INVENTOR.
HOWARD J. MARSCHAK
BY Max P. Kraus

United States Patent Office 3,174,442
Patented Mar. 23, 1965

3,174,442
DISPLAY STAND
Howard J. Marschak, Evanston, Ill.
(1544 W. Elmdale Ave., Chicago, Ill.)
Filed Mar. 19, 1963, Ser. No. 266,344
8 Claims. (Cl. 108—27)

This invention relates to a display stand.

One of the objects of this invention is to provide a display stand which may be shipped disassembled and may be readily set up without the use of bolts or extraneous fastening elements.

Another object of this invention is to provide a display stand provided with hook members, whereby the stand may be readily set up in a standing position by hooking of the elements, without requiring the use of any bolts or other types of fastening elements.

Another object of this invention is to provide a display stand of the foregoing character which may interchangeably support a shelf or a basket.

Another object of this invention is to provide a display stand provided with a collapsible basket.

With the present invention, the parts comprising the display stand are so constructed that they may be connected and interlocked with their adjacent parts merely by the positioning of the hooking elements in their proper relation, and by virtue of such hooking relation the stand is supported in a fully upright position.

This invention eliminates the use of bolts, nuts, screws, or other fastening elements which have to be manipulated or tightened to effect a locking of the parts. When set up, the display stand is sturdy and will readily support the material and products to be displayed. It can also be readily disassembled and stored away in a minimum of time and with a minimum of effort. It requires a minimum of shipping and storage space.

Other objects and advantages will become apparent as this description progresses.

Figure 1:
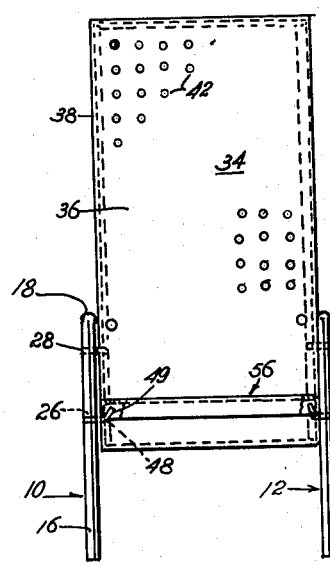
FIG. 1 is a front elevational view of the display stand.
Figure 2:
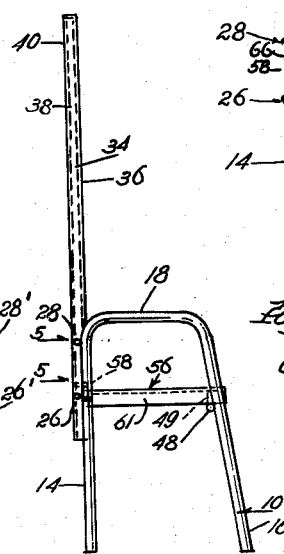
FIG. 2 is a side elevational view of same.
Figure 3:
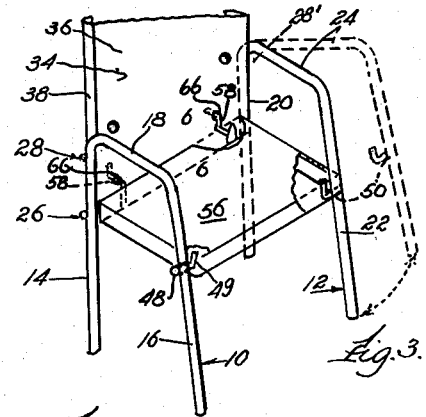
FIG. 3 is a perspective view of the lower portion of the stand and showing in dotted lines the movement of the side member from its initial hooking position to the full line stand supporting position.

Reference will first be made to the display stand shown in FIGS. 1 to 6 inclusive.

The display stand includes a pair of side members generally indicated at 10 and 12, which are identically formed, made preferably of tubular material and are of generally inverted U-shape configuration. These two side members form the legs or supporting structure for the unit.

Side member 10 has a rear leg 14, a front leg 16 which is inclined at an angle with respect to the vertical, and a connecting portion therebetween designated by the numeral 18. Side member 12 has a rear leg 20, a front inclined leg 22 and a connecting portion 24. Each of the identically shaped side members described is formed preferably of a single integral tubular member bent and formed as shown and described.

Figure 5:
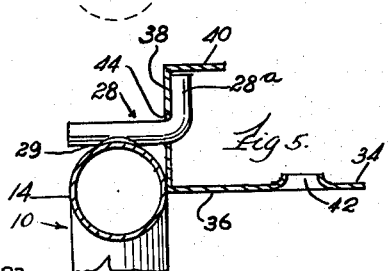
FIG. 5 is a top plan view taken on lines 5—5 of FIG. 2.

Secured to the rear leg 14 of side member 10 in spaced relation is a pair of L-shaped hooking members designated by the numerals 26 and 28. These L-shaped hooking members are each welded to the rear portion of the leg 14, as best shown in FIG. 5 and indicated by the numeral 29, and extend transversely thereof with a portion like 28a of each of the hooking members extending rearwardly of the leg. The hooking member 28 is positioned adjacent the top of the leg, with the hooking member 26 positioned below in spaced relation thereto.

The rear leg 20 of side member 12 has similar hooking members 26' and 28'. It will be seen that the rearwardly extending portions (like portion 28a) of each of the hooking members 26, 28, 26' and 28' are inwardly of their respective legs when the side members are in stand supporting position, as best seen in FIG. 5. Thus, the rear legs 14 and 20 of each side member has a pair of spaced similar L-shaped hooking members, each with a rearwardly extending hooking member (like 28a) as an integral part of the legs. These hooking members are adapted to be secured to a panel generally indicated at 34, which is formed preferably of metal.

Figure 4:
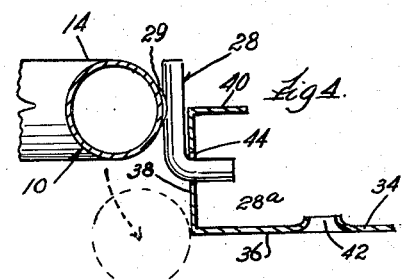
FIG. 4 is a view showing the manner of initially securing one of the side members to the back panel from which position the side member is moved forwardly until it assumes the position shown in FIG. 5.

The panel in cross-section is best shown in FIGS. 4 and 5 and comprises a front wall 36 and rearwardly extending spaced side walls 38 extending the full width of the front wall 36. The side walls 38 have inwardly turned flanges 40. The front wall 36 is provided with equally spaced apertures 42 to which hooks are detachably secured to support articles to be displayed, as is well understood.

Each of the opposite side walls 38 of the panel 34 is provided with a pair of spaced openings 44 and 46 adjacent the lower end thereof and said openings are spaced to conform to the spacing of the hooking members 26 and 28 on leg member 14 and 26' and 28' on the other leg member 20 for the purpose of receiving same. To secure each of the side members 10 and 12 to the panel 34, the side member, for example, side member 10 is first positioned as shown in FIG. 4 in substantially the same plane as panel 34 but laterally thereof, in which the hooking ends (like 28a) of the hooking members 26' and 28' on the rear leg thereof are inserted in the spaced openings 44 and 46 on the side walls of the panel. After thus inserted the side member 10 is swung or moved forwardly, as indicated by the arrow in FIG. 4, to the full line position of FIG. 5, to be at right angles to the panel 34, and by thus swinging the side member forwardly the hooking members 26 and 28 will assume the position shown in FIG. 5, with the portion 28a of each hook positioned adjacent the inside of the side wall 38 and parallel thereto. The side member 10 is thus secured or coupled to the panel 34 by the two hooking members 26 and 28.

The side member 12 is likewise secured in this manner, namely, first positioning the side member 12 to the side of the opposite side wall 38 in the same plane as panel 34 but laterally thereof so that the hooking members 26′ and 28′ on the rear leg 20 engage the respective openings 44 and 46 of said opposite side wall, and then moving the side member forwardly and at right angles to the panel 34, corresponding to the position shown in FIG. 5. The panel 34 is thus connected and hooked to the two side members 10 and 12.

The front leg of each of the side members is provided with a hook. For example, secured to the front leg 16 of side member 10 is a generally L-shaped hook 48 which extends rearwardly and transversely of the front leg, with the hooking end 49 extending inwardly and upwardly. The front leg 22 of side member 12 has a similar hook 50. Said hooks each are welded to the leg as to be an integral part thereof.

Figure 6:
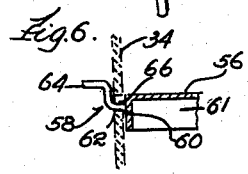
FIG. 6 is a sectional view taken on lines 6—6 of FIG. 3.

As shown in FIGS. 1, 2, 3 and 6, a shelf is supported on the stand. The shelf designated by the numeral 56 is provided with downwardly extending front, side and rear walls. A pair of anchoring members 58 are secured, as by welding, in spaced relation to the rear wall 60 of the shelf, as best seen in FIG. 6. The anchoring members 58 have a horizontal rearwardly extending portion 62 which continues and forms an inverted L-shaped hooking end 64.

The hooking ends 64 of the anchoring members 58 are inserted in properly alined openings 66 in the lower portion of the panel 34 and the anchoring members are then positioned to assume the position shown in FIG. 6, in which the hooking end 64 is positioned rearwardly of the panel 34. The front portion of the shelf 56 rests on the two inwardly extending hooks 48 in which the hooking end 49 extends inwardly of the side wall 61 of the shelf. The display stand is thus set up merely by hooking the parts as aforesaid, without the use of any bolts, nuts, or other fastening means.

Figure 7:
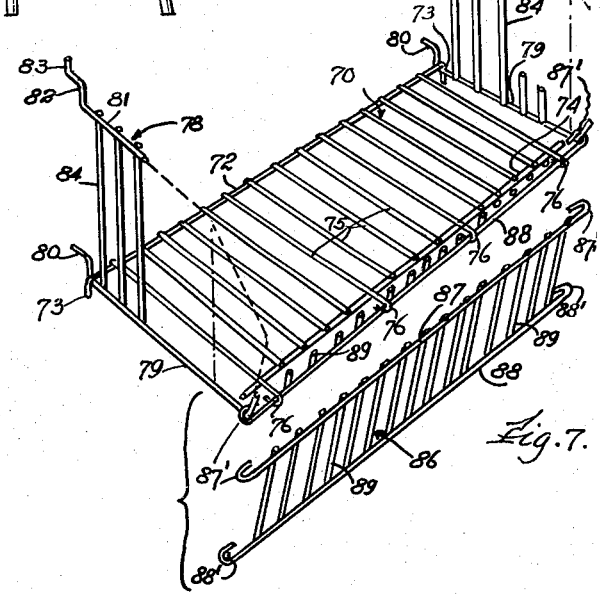
FIG. 7 is an exploded perspective view of a collapsible or put-together basket which may be supported on the stand in lieu of the shelf. In the assembled view of the basket the front section is broken away.
Figures 8, 9:
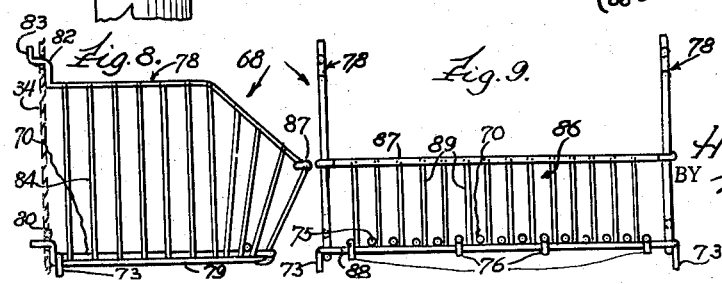
FIG. 8 is a side view thereof.
FIG. 9 is a front view thereof.
Figure 10:
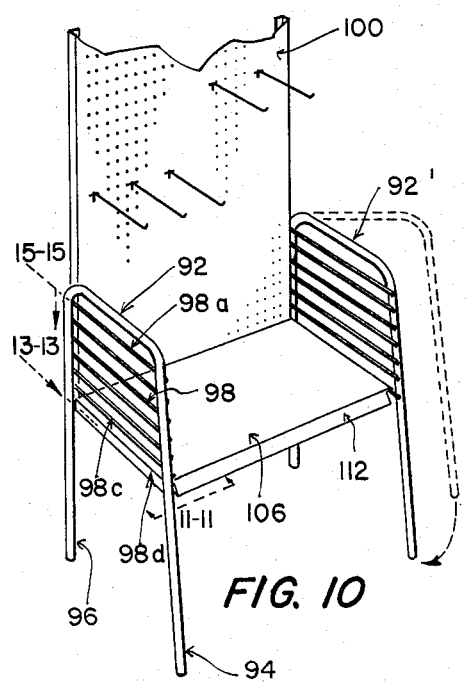
FIG. 10 is a perspective view of a modified construction.

FIGS. 7, 8 and 9 illustrate a collapsible or put-together wire basket generally indicated at 68 which may be supported on the stand and used in lieu of the shelf 56 described. The bottom section 70 of the basket is formed of wire members which include a rear longitudinal wire member 72 with opposite downwardly turned ends 73, and a front wire member 74. Spaced transverse wire members 75 are welded or otherwise secured to the longitudinal wires 72 and 74. Certain of the transverse wire members extend forwardly of the front wire member 74 and terminate in downwardly extending hooks 76.

The opposite side members 78 each have a lower wire member 79 terminating at their rear end in an upwardly extending inverted L-shaped hook 80. The upper wire member 81 also terminates at the rear in a similar inverted L-shaped hook 82, which however has a continuing vertical end section 83. Vertical wire members 84 are connected to the upper and lower wire members 79 and 81.

The front member 86 of the basket has spaced upper and lower longitudinally extending wires 87 and 88 connected by vertical wires 89. The opposite ends of the longitudinal wires are turned inwardly to form hooks 87′ and 88′ to engage and hook to the side members 78. The hooks 76 of the bottom section engage the lower longitudinal wire 88.

The basket is shipped disassembled and may be readily put together by positioning the side member at the ends of the bottom section, with the downwardly extending hooks 73 engaging the lower wire member 79, as best seen in FIG. 7. The front member 86 is then secured and hooked to the front of the side members through the hooking members 87′, 88′ and 76. As thus assembled the basket may be secured to the stand in lieu of the shelf in the same manner as was the shelf. The hooks 80 and 83 are secured to suitable openings in the panel 34 with the front of the basket connected to hooks 48 on the front legs.

The modified construction shown in FIGS. 10 to 15 inclusive will now be described.

The modified display stand includes a pair of side members generally indicated at 92 and 92′ which are identically formed and made preferably of tubular material and are of generally inverted U-shaped configuration. These two side members form the legs or supporting structure for the unit.

Figure 14:
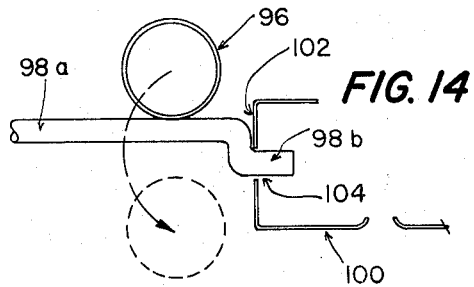
FIG. 14 is a view showing the manner of initially securing one of the side members to the back panel from which position the side member is moved forwardly until it assumes the position shown in FIG. 15.
Figure 15:
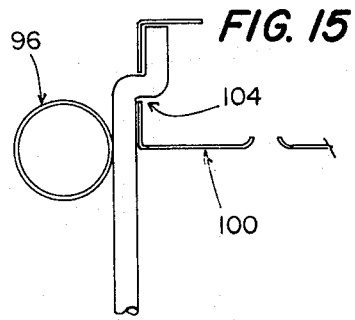
FIG. 15 is a top plan view taken on lines 15—15 of FIG. 10.

Extending between the front leg 94 and rear leg 96 of each side member and welded or otherwise secured thereto are rigid wires or rods 98 which are spaced from each other. The rear end of the uppermost rod which is designated by the numeral 98a has an inwardly and rearwardly extending hook member 98b which is generally of L-shape and is best shown in FIGS. 14 and 15. The rigid wire or rod designated by the numeral 98c (second from the bottom) is of similar shape and construction and has a hook member similar to hook 98b. These two hook members are adapted to engage and be connected to the sides of the panel member. The opposite side member 92′ of the stand is similarly constructed.

The panel generally designated by the numeral 100 is similar in construction to panel 34 previously described and likewise has side walls 102 provided with spaced openings 104 to accommodate the hook members 98b, in the manner previously described. Hook members 98b are inserted in the side openings 104, as shown in FIG. 14, in which the side members 92 and 92′ are positioned in substantially the same plane as the panel 100 but laterally thereof, and in which the end of hook 98b enters the opening 104. After thus inserted, side members 92 and 92′ are swung or moved forwardly, as indicated by the arrow in FIG. 14 to the full line position of FIG. 15, to be at right angles to the panel 100 to securely lock the side members to the panel.

Figure 11:
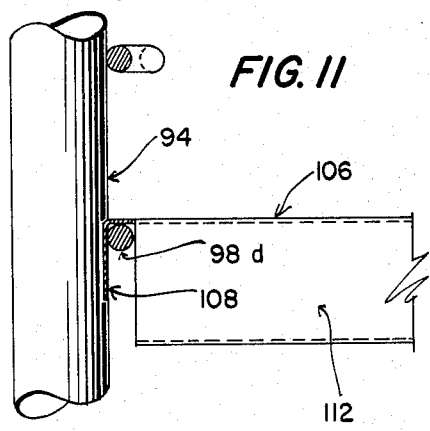
FIG. 11 is a view taken on lines 11—11 of FIG. 10.
Figure 12:
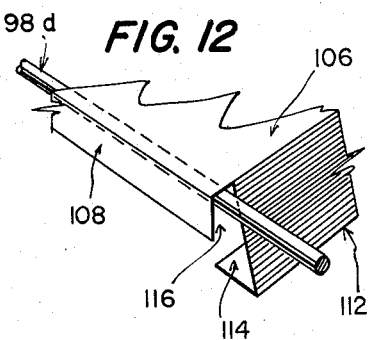
FIG. 12 is a broken away perspective view showing the attachment of the shelf to the side member.
Figure 13:
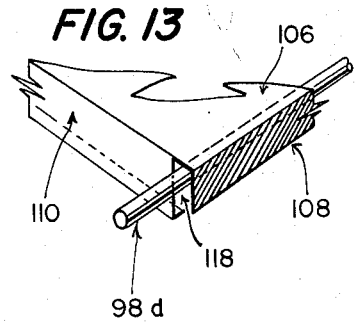
FIG. 13 is a broken away perspective view taken on lines 13—13 of FIG. 10.

The shelf generally designated by the numeral 106 is provided with downwardly extending front, side and rear walls. The side walls 108, best shown in FIGS. 11 and 12, extend substantially at right angles to the top of the shelf. The rear wall 110 and the side wall 108 are of substantially the same height. The front wall 112 extends forwardly at an angle, as best seen in FIG. 12, and then turns inwardly to provide an inwardly facing flange 114. The front wall 112 extends below the side and rear walls 108 and 110. Both the rear and front walls 110 and 112 do not extend the full width of the shelf but terminate short of the sides to provide cutouts or slot portions adjacent each of the opposite sides. A slot 116 is provided at each side at the front and a slot 118 is provided at each of the opposite sides at the rear. The front and rear slots are in alignment so that the shelf 106 may be positioned on and engage the lowest rigid wire member 98d of the stand, as shown in FIGS. 11 and 12, by engaging said rigid wire, with the wire extending inside of the side walls 108 and passing through the front and rear slots 116 and 118. With this arrangement the shelf is secured to the side members 92 and 92′ merely by positioning the shelf to engage the wire members 98d without requiring the use of any other fastening elements.

A basket may be used in lieu of the shelf with the modified stand described. In the event a basket is substituted for the shelf, the basket shown in FIGS. 7, 8 and 9 could be used, modified however to the extent that the front wire member 74 thereof be extended with the ends thereof turned downwardly to form hooks similar to hooks 73 on the rear wire member 72. In such case the front and rear wire members of the basket would have hooks similar to hooks 73, shown in FIG. 7, and could be hooked to the lower rigid wire members or bars 98d of side members 92 and 92′. Also, the basket could be modified to the extent that the side members 78 of the basket shown in FIG. 7 are eliminated, since the wires on the sides 92 and 92′ could form the side walls for the basket.

It will thus be appreciated that the entire display stand can be readily set up and connected together to support and display products and merchandise merely by hooking the elements together and the stand will be rigid and will provide a solid and effective display stand.

It will be understood that various changes and modifications may be made from the foregoing without departing from the spirit and scope of the appended claims.

What is claimed is:

1. A display stand comprising a pair of generally U-shaped side members forming the base for said stand, said side members having front and rear legs, hooking members of generally L-shaped configuration secured to the rear legs and extending rearwardly thereof, a rear panel member having a front wall and a plurality of spaced apertures in said front wall to accommodate detachable hooks for supporting articles on display on said panel, said panel having side flanges adjacent the opposite ends of said front wall, said side flanges having openings therein to receive the L-shaped hooking members on said rear legs which pass through said side flanges, with a portion of said hooking members resting adjacent the inside surface of said side flanges and parallel thereto, hooking members on said front legs, and a horizontally positioned member having hooking members on the rear thereof adapted for detachable securement to certain of said apertures in the front wall of said rear panel which are adjacent the rear of said horizontally positioned member.

2. A collapsible display stand adapted to be secured and connected together solely by hooking members, said stand comprising a pair of side members having front and rear legs connected by a connecting member, each of said rear legs provided with spaced hooking members of generally L-shaped configuration with the hook ends extending rearwardly of the rear leg, a panel having a front wall and opposite spaced side flanges, said front wall having a plurality of apertures to accommodate detachable hooks for supporting articles on display on said panel, each said side flange having a pair of spaced openings in alinement with the spaced position of said L-shaped hooking members so that said hooking members are inserted in said spaced openings with a portion of said hooking member resting adjacent the inside surface of said side flange and parallel thereto to secure said panel to said side members, a horizontally positioned member supported between said side members and forwardly of said panel, said horizontally positioned member having rearwardly extending hook members for connection to said panel, and means on said front legs for detachable securement to said horizontally positioned member to support the front of said horizontally positioned member.

3. A display stand comprising a pair of generally U-shaped side members forming the base for said stand, said side members having front and rear legs, hooking members of a generally L-shaped configuration secured to said rear legs and extending rearwardly thereof, a rear panel member having a front wall and spaced side flanges extending rearwardly of said front wall, said front wall having a plurality of spaced apertures to accommodate detachable hooks for supporting articles on display on said panel, said flanges having openings therein to receive the L-shaped hooking members on said rear legs with a portion of said hooking member passing through the opening in the flange and resting adjacent the inside surface of said side flange and parallel thereto, and a horizontally positioned member detachably supported between said legs.

4. A structure as defined in claim 3 in which the horizontally positioned member has hooking members on the rear thereof adapted for detachable securement to certain of the apertures in the front wall of the rear panel which are adjacent the rear of the horizontally positioned member.

5. A structure as defined in claim 3 in which hooking members are provided on the front legs for engaging the horizontally positioned member.

6. A structure as defined in claim 3 in which hooking members are provided in the front legs for engaging the horizontally positioned member.

7. A structure as defined in claim 3 in which the horizontally positioned member is a shelf.

8. A structure as defined in claim 3 in which the horizontally positioned member is a basket.

References Cited by the Examiner

UNITED STATES PATENTS

| | | | |
|---|---|---|---|
| 2,279,864 | 4/42 | Eide | 211—177 |
| 2,338,968 | 1/44 | Robinson et al. | 108—101 |
| 2,680,522 | 6/54 | Temple | 211—181 X |
| 2,913,210 | 11/59 | Tichnor | 248—223 |
| 2,994,441 | 8/61 | Browning | 211—177 |
| 3,004,814 | 10/61 | Schulze | 211—133 X |
| 3,069,122 | 12/62 | Babajoff | 248—223 |
| 3,091,345 | 5/63 | Hoose et al. | 211—181 X |
| 3,101,148 | 8/63 | Brown | 211—181 X |

FRANK B. SHERRY, *Primary Examiner.*